(12) United States Patent
Hanson et al.

(10) Patent No.: US 9,453,456 B2
(45) Date of Patent: Sep. 27, 2016

(54) ELECTRONIC PRE-CHAMBER INJECTOR

(71) Applicants: Kent R. Hanson, Loveland, CO (US); Curtis C. Vars, Andover, NY (US)

(72) Inventors: Kent R. Hanson, Loveland, CO (US); Curtis C. Vars, Andover, NY (US)

(73) Assignee: Dresser-Rand Company, Olean, NY (US)

( * ) Notice: Subject to any disclaimer, the term of this patent is extended or adjusted under 35 U.S.C. 154(b) by 18 days.

(21) Appl. No.: 14/562,886

(22) Filed: Dec. 8, 2014

(65) Prior Publication Data
US 2015/0204232 A1 Jul. 23, 2015

Related U.S. Application Data

(60) Provisional application No. 61/929,790, filed on Jan. 21, 2014.

(51) Int. Cl.
| | |
|---|---|
| F02B 19/00 | (2006.01) |
| F02B 19/10 | (2006.01) |
| F02M 51/06 | (2006.01) |
| F02M 61/08 | (2006.01) |

(52) U.S. Cl.
CPC ....... *F02B 19/1085* (2013.01); *F02B 19/1004* (2013.01); *F02B 19/108* (2013.01); *F02M 51/061* (2013.01); *F02M 51/0653* (2013.01); *F02M 61/08* (2013.01); *Y02T 10/125* (2013.01)

(58) Field of Classification Search
CPC .......................... F02B 19/108; F02B 19/1085
USPC .................................................. 123/261, 275
See application file for complete search history.

(56) References Cited

U.S. PATENT DOCUMENTS

| | | | | |
|---|---|---|---|---|
| 3,906,922 A | * | 9/1975 | Dane, Jr. ................... | F01L 7/10 123/190.1 |
| 4,075,996 A | * | 2/1978 | Hisserich .................. | F02B 7/02 123/143 A |

(Continued)

*Primary Examiner* — Thomas Moulis

(57) ABSTRACT

A solenoid valve for a pre-chamber of an internal combustion engine is provided. The solenoid valve may include a valve body defining an inlet port fluidly coupled with a fuel line, an outlet port fluidly coupled with the pre-chamber, and a passage fluidly coupling the inlet port with the outlet port. A valve stem may be slidably disposed in the passage between a first position and a second position. The valve stem may be configured to engage the outlet port in the first position to thereby prevent fluid communication therethrough. A biasing member may be disposed in the passage and configured to actuate the valve stem to the first position. A solenoid may be coupled with the valve body and configured to actuate the valve stem to the second position to thereby allow fluid communication therethrough.

16 Claims, 3 Drawing Sheets

(56) References Cited

U.S. PATENT DOCUMENTS

| | | | | |
|---|---|---|---|---|
| 4,119,066 A * | 10/1978 | Happel | F02B 19/1085 | 123/275 |
| 4,311,280 A * | 1/1982 | Knape | F02M 51/0685 | 239/585.2 |
| 4,405,912 A * | 9/1983 | Palma | F02M 51/005 | 335/260 |
| 4,718,635 A * | 1/1988 | de Concini | F02M 51/0678 | 239/585.5 |
| 4,749,892 A * | 6/1988 | Mesenich | F02M 51/0625 | 310/19 |
| 5,012,982 A * | 5/1991 | Souma | F02M 51/0682 | 239/585.4 |
| 5,081,970 A * | 1/1992 | Matsuoka | F02B 77/02 | 123/275 |
| 5,887,566 A * | 3/1999 | Glauber | F02D 19/105 | 123/27 GE |
| 6,021,997 A * | 2/2000 | Hell | F15B 13/0403 | 251/129.07 |
| 6,510,841 B1 * | 1/2003 | Stier | F02M 51/0625 | 123/472 |
| 8,050,848 B2 * | 11/2011 | Huschenbett | F02B 19/1085 | 123/267 |
| 8,387,599 B2 * | 3/2013 | McAlister | F02M 57/06 | 123/41.05 |
| 8,528,842 B2 * | 9/2013 | Hoang | | 123/472 |
| 8,826,883 B2 * | 9/2014 | Ishida | F01P 3/16 | 123/261 |
| 2006/0027685 A1 * | 2/2006 | Reiter | F02M 51/0675 | 239/585.1 |
| 2008/0277505 A1 * | 11/2008 | Hoang | F02M 51/0685 | 239/585.5 |
| 2011/0278368 A1 * | 11/2011 | Hornby | F02M 51/0671 | 239/5 |

* cited by examiner

ELECTRONIC PRE-CHAMBER INJECTOR

CROSS REFERENCE TO RELATED APPLICATIONS

This application claims the benefit of U.S. Provisional Patent Application having Ser. No. 61/929,790, which was filed Jan. 21, 2014. The aforementioned patent application is hereby incorporated by reference in its entirety into the present application to the extent consistent with the present application.

BACKGROUND

Engines, such as internal combustion engines, may often utilize fuel from a variety of sources, such as natural gas or gas produced from landfills. The chemical content or components of the fuel from the variety of sources may vary widely; however, a major component common throughout the variety of sources is methane, which provides a suitable fuel for the engines. While the variety of sources may provide a suitable fuel for the engines, combustion of the fuel may result in the formation of solid deposits within the engines. In many cases, the solid deposits may cause inadequate valve sealing, which may ultimately result in malfunction (e.g., misfiring) of the engines and/or components thereof. In addition to the solid deposits, the combustion of the fuel may often lead to increased exhaust emissions (e.g., NOx emissions) from the engines. The increased exhaust emissions may often exceed the stringent limits imposed and enforced by Government agencies, such as the United States Environmental Protection Agency (EPA).

In view of the foregoing, conventional internal combustion engines often utilize lean fuel mixtures (i.e., air and fuel mixture containing a relatively high ratio of air to fuel) in an effort to reduce the exhaust emissions. To combust the leaner fuel mixtures, however, the internal combustion engines often employ pre-combustion chambers, often referred to as pre-chambers, in fluid communication with a main combustion chamber. The pre-chambers may contain rich fuel mixtures (i.e., mixtures containing a relatively high ratio of fuel to air), and the main combustion chamber may contain the lean fuel mixtures. In operation, the rich fuel mixtures may be directed from a fuel supply to the pre-chambers via one or more valves (e.g., check valve) and combusted therein. Combustion of the rich fuel mixtures in the pre-chambers subsequently leads to the combustion of the lean fuel mixtures contained in the main combustion chamber.

While the pre-chambers have proven to be effective in reducing the exhaust emissions in conventional internal combustion engines, employing the pre-chambers may often lead to incomplete or inefficient combustion of the fuel mixtures and poor fuel economy. The incomplete or inefficient combustion of the fuel mixtures may often be attributed or traced back to the check valves configured to control a flow of the rich fuel mixtures from the fuel supply to the pre-chamber. Conventional check valves are often designed to be actuated by pressure differentials between the fuel supply and the pre-chamber. For example, during an intake stroke, the pressure in the main combustion chamber drops below the pressure in the fuel supply, creating a pressure differential therebetween. The pressure differential between the fuel supply and the main combustion chamber opens the check valve, thereby allowing a flow of the rich fuel mixtures to the pre-chamber. Further, during a compression stroke, the pressure in the main combustion chamber increases above the pressure in the fuel supply to close the check valve, thereby preventing the flow of the rich fuel mixtures to the pre-chamber. Accordingly, it may be appreciated that the flow of the rich fuel mixtures via the check valve may be crudely controlled or regulated by varying the pressures of the gas supply and/or the main combustion chambers. Crudely regulating the flow of the rich fuel mixture in this manner, however, may often lead to inconsistent concentrations, incomplete combustion, poor fuel economy, and ultimately, inefficient operation of the engines.

What is needed, then, is an improved valve for regulating a flow of fuel to pre-chambers of internal combustion engines.

SUMMARY

Embodiments of the disclosure may provide a solenoid valve for a pre-chamber of an internal combustion engine. The solenoid valve may include a valve body defining an inlet port fluidly coupled with a fuel line at a first end portion thereof, an outlet port fluidly coupled with the pre-chamber at a second end portion thereof, and a passage fluidly coupling the inlet port with the outlet port. The solenoid valve may also include a valve stem slidably disposed in the passage between a first position and a second position. A first end portion of the valve stem may be configured to engage the outlet port in the first position to thereby prevent fluid communication therethrough. A biasing member may be disposed in the passage and configured to apply a biasing force to the valve stem to thereby actuate the valve stem to the first position and engage the first end portion of the valve stem with the outlet port. A solenoid may be coupled with the valve body and configured to actuate the valve stem to the second position. The valve stem may be actuated to the second position to disengage the first end portion of the valve stem from the outlet port and allow fluid communication therethrough.

Embodiments of the disclosure may also provide another solenoid valve for a pre-chamber. The solenoid valve may include a valve body defining an inlet port at a first end portion thereof, an outlet port fluidly coupled with the pre-chamber at a second end portion thereof, and a passage fluidly coupling the inlet port with the outlet port. The valve body may include an upper annular portion defining an upper portion of the passage, an annular pole piece coupled with the upper annular portion, and a lower annular portion coupled with the annular pole piece. The annular pole piece and the lower annular portion may at least partially define a lower portion of the passage. A valve stem may be slidably disposed in the passage between a first position and a second position. A first end portion of the valve stem may be configured to engage the outlet port in the first position to thereby prevent fluid communication therethrough. A biasing member may be disposed in the lower portion of the passage and configured to apply a biasing force to the valve stem. The biasing force applied to the valve stem may actuate the valve stem to the first position and engage the first end portion of the valve stem with the outlet port. A solenoid may be coupled with the upper annular portion. The solenoid may be configured to actuate the valve stem to the second position and disengage the first end portion of the valve stem from the outlet port to thereby allow fluid communication therethrough.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
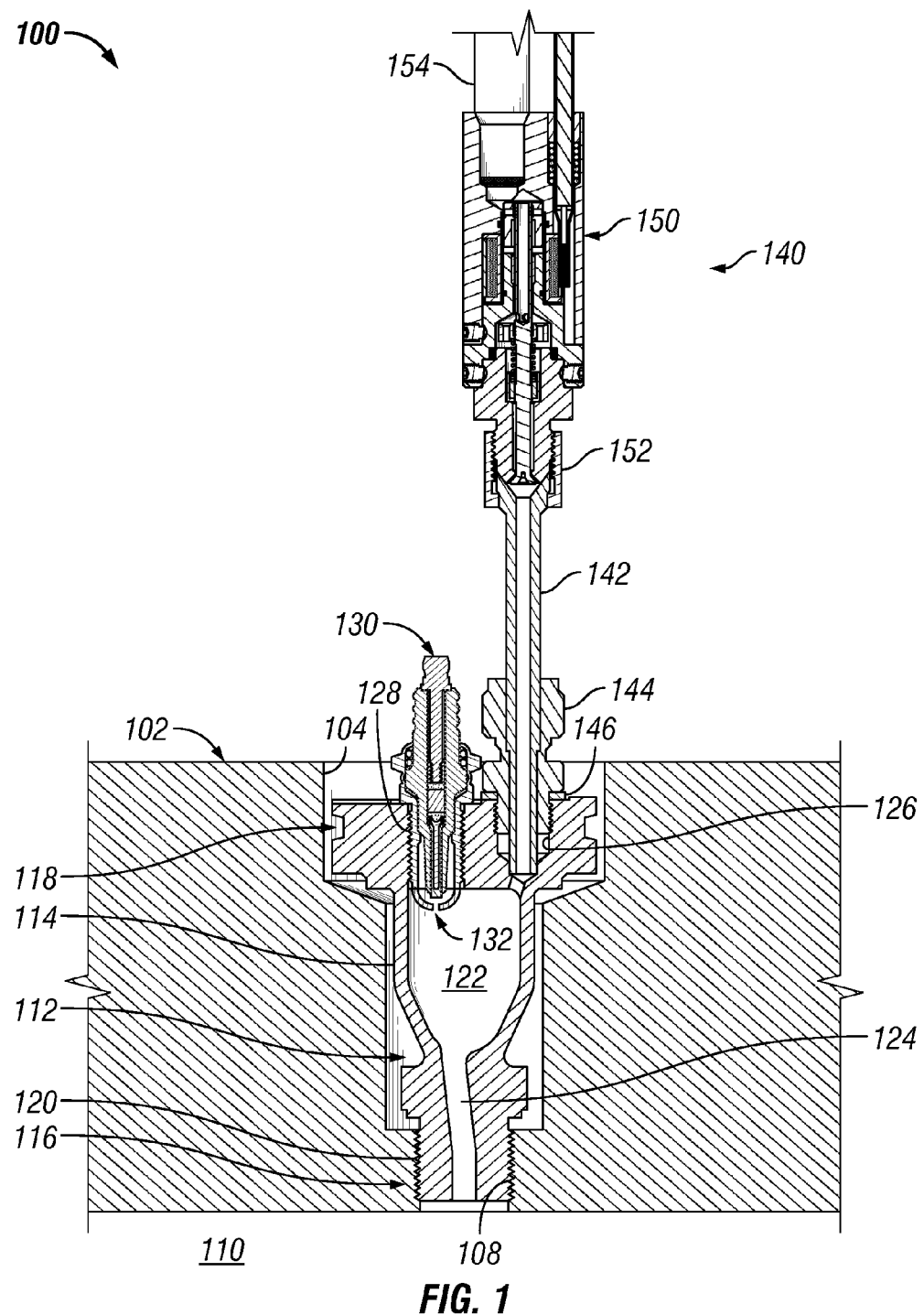
FIG. 1 illustrates a cross-sectional view of a fuel feed assembly and a pre-chamber assembly installed in a cylinder head of an internal combustion engine, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Referring to FIG. 1, a portion of a cylinder head 102 of an internal combustion engine 100 is illustrated. The cylinder head 102 may define a blind hole 104 at least partially extending from an outer surface toward an inner surface of the cylinder head 102. In at least one embodiment, the blind hole 104 may be a spark plug well formed in the cylinder head 102. The cylinder head 102 may also define a threaded hole 108 extending from the blind hole 104 to and through the inner surface of the cylinder head 102. The threaded hole 108 may provide communication between the blind hole 104 and a main combustion chamber 110 in a cylinder (not shown) of the internal combustion engine 100.

In at least one embodiment, a pre-combustion chamber assembly, or pre-chamber assembly 112, may be at least partially disposed in the blind hole 104 and coupled with the cylinder head 102 via the threaded hole 108. The pre-chamber assembly 112 may include a housing 114 having a first end portion 116 and a second end portion 118. In at least one embodiment, the first end portion 116 of the housing may define threads 120 configured to couple the pre-chamber assembly 112 with the cylinder head 102. For example, as illustrated in FIG. 1, the threads 120 may secure or engage the threaded hole 108 defined in the cylinder head 102 to couple the pre-chamber assembly 112 with the cylinder head 102. In at least one embodiment, the housing 114 may define a pre-combustion chamber, or pre-chamber 122, extending substantially from the first end portion 116 to the second end portion 118, and fluidly coupled with the main combustion chamber 110 of the internal combustion engine 100. For example, the pre-chamber 122 may be fluidly coupled with the main combustion chamber 110 via a port 124 extending through the first end portion 116 of the housing 114.

In an exemplary embodiment, as illustrated in FIG. 1, the second end portion 118 of the housing 114 may define a fuel inlet bore 126 fluidly coupled with the pre-chamber 122 and configured to direct a fuel or fuel mixture (e.g., a rich fuel mixture) to the pre-chamber 122. The second end portion 118 may further define a threaded bore 128 configured to receive a spark plug 130. As further illustrated in FIG. 1, the spark plug 130 may be disposed in the threaded bore 128 such that an electrode 132 of the spark plug 130 extends into the pre-chamber 122. In operation, the spark plug 130 may be coupled with an ignition system (not shown) of the internal combustion engine 100 and configured to create a spark at the electrode 132 to combust the fuel mixture directed to the pre-chamber 122. The combustion of the fuel mixture within the pre-chamber 122 may create a flame that may expand out of the pre-chamber 122 to the main combustion chamber 110 via the port 124.

In at least one embodiment, a fuel feed assembly 140 may be fluidly coupled with the fuel inlet bore 126 and configured to direct the fuel mixture to the pre-chamber 122. The fuel feed assembly 140 may include a fuel pipe or conduit 142 coupled with the housing 114 via a pipe fitting 144. A washer 146 may be at least partially disposed between the pipe fitting 144 and the housing 114 to provide a fluid tight seal therebetween. The fuel feed assembly 140 may further include a valve assembly 150 coupled with the fuel pipe 142. For example, as illustrated in FIG. 1, the valve assembly 150 may be coupled with the fuel pipe 142 via a coupling, such as a valve retainer 152. In operation, the valve assembly 150 may receive the fuel mixture from a fuel supply (not shown) via a fuel line 154 fluidly coupled therewith and direct the fuel mixture from the fuel line 154 to the pre-chamber 122 via the fuel pipe 142 and the fuel inlet bore 126. As further described herein, a flow of the fuel mixture from the fuel line 154 to the pre-chamber 122 may be controlled or regulated by the valve assembly 150.

Figure 2A:
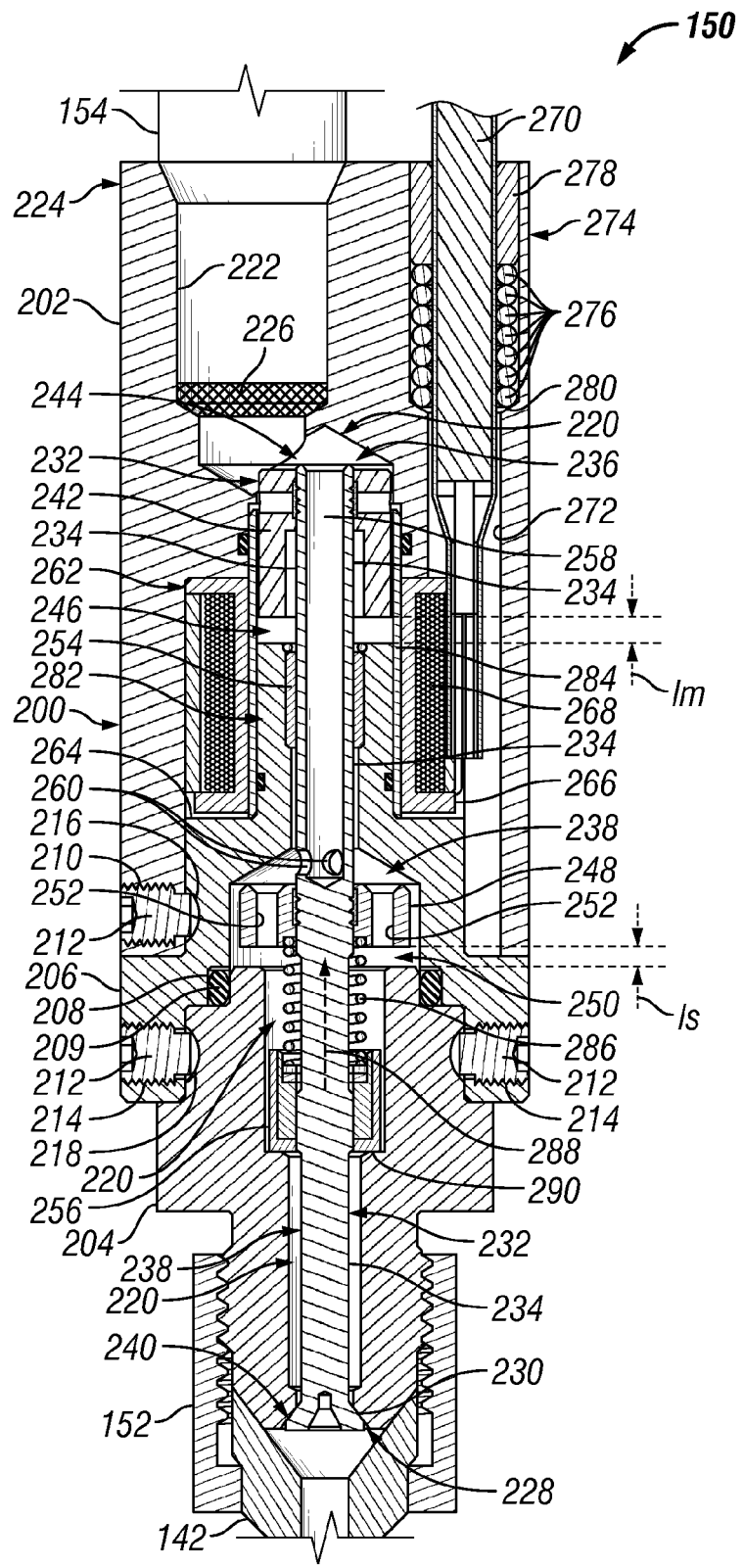
FIG. 2A illustrates a cross-sectional view of a valve assembly of the fuel feed assembly of FIG. 1 in a closed position, according to one or more embodiments disclosed.
Figure 2B:
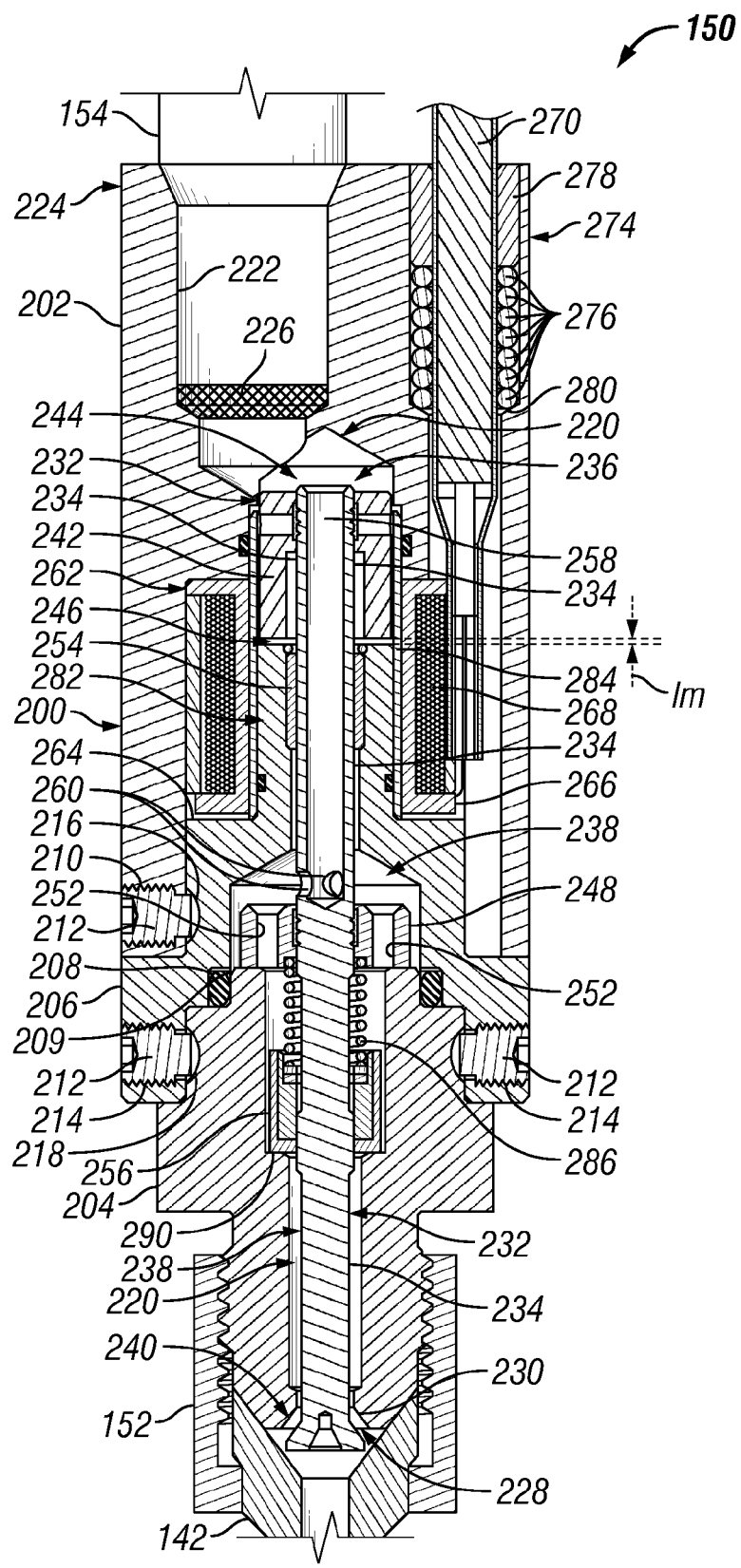
FIG. 2B illustrates a cross-sectional view of the valve assembly of the fuel feed assembly of FIG. 1 in an opened position, according to one or more embodiments disclosed.

Referring now to FIGS. 2A and 2B, the valve assembly 150 may include a valve body 200 configured to fluidly couple the fuel line 154 with the fuel pipe 142. The valve body 200 may include an upper valve body 202, a lower valve body 204, and a pole piece 206 interposed between the upper valve body 202 and the lower valve body 204. The upper valve body 202, the lower valve body 204, and the pole piece 206 may be or form annular portions of the valve body 200. In at least one embodiment, the upper valve body 202, the lower valve body 204, and the pole piece 206 may be coupled with one another. For example, the upper valve body 202 may define one or more circumferentially arrayed perforations (one is shown 210) extending therethrough from an outer surface to an inner surface thereof. The perforations 210 may be configured to receive one or more mechanical fasteners 212 to facilitate the coupling of the upper valve body 202 with the pole piece 206. The mechanical fasteners 212 may extend through the perforations 210 defined in the upper valve body 202 and engage one or more pockets 216 formed in the pole piece 206. Additionally, the pole piece 206 may also define one or more circumferentially arrayed perforations 214 extending therethrough from an outer surface to an inner surface thereof and configured to receive one or more of the mechanical fasteners 212 to facilitate the coupling of the pole piece 206 with the lower valve body 204. Similarly, the mechanical fasteners 212 may extend through the perforations 214 defined in the pole piece 206 and engage one or more pockets 218 formed in the lower valve body 204. Illustrative mechanical fasteners may include, but are not limited to, a series of bolts, set screws, and/or any other known mechanical fasteners 212. In at least one embodiment, coupling the upper valve body 202 with the pole piece 206 and/or the pole piece 206 with the lower valve body 204 may provide a fluid tight seal therebetween. In another embodiment, one or more seals 208 (e.g., O-rings) may be disposed between the upper valve body 202 and the pole piece 206, or between the pole piece 206 and the lower valve body 204. For example, as illustrated in FIGS. 2A and 2B, the pole piece 206 may include one or more circumferential channels or grooves 208 having the seal 209 disposed therein.

In at least one embodiment, the valve body 200 of the valve assembly 150 may at least partially define or form a passage 220 through which the fuel mixture may be flowed. The passage 220 may extend through at least a portion of the valve body 200 and fluidly couple the fuel line 154 with the fuel pipe 142. In at least one embodiment, the upper valve body 202, the lower valve body 204, and/or the pole piece 206 may at least partially define the passage 220 extending through the valve body 200. For example, as illustrated in FIGS. 2A and 2B, the upper valve body 202 may define an upper portion 236 of the passage 220. In another example, illustrated in FIGS. 2A and 2B, the pole piece 206 and/or the lower valve body 204 may define a lower portion 238 of the passage 220.

In at least one embodiment, a first end portion 224 of the upper valve body 202 may define an inlet port 222 fluidly coupled with the fuel line 154. The upper portion 236 of the passage 220 may be fluidly coupled with the fuel line 154 via the inlet port 222 and configured to receive the fuel mixture therefrom. In at least one embodiment, a filter 226 may be disposed in the inlet port 222 such that the fuel line 154 may be in fluid communication with the upper portion 236 of the passage 220 via the inlet port 222 and the filter 226 disposed therein. The filter 226 may be configured to separate one or more solid particulates from the fuel mixture flowing therethrough.

As previously discussed, the valve assembly 150 may be coupled with the fuel pipe 142 via the valve retainer 152. For example, as illustrated in FIGS. 2A and 2B, the lower valve body 204 may define a plurality of threads configured to couple the valve assembly 150 with the fuel pipe 142 via the valve retainer 152. The lower valve body 204 may also define an outlet 228 fluidly coupling the lower portion 238 of the passage 220 with the fuel pipe 142. In at least one embodiment, as illustrated in FIGS. 2A and 2B, at least a portion of the outlet 228 may be generally conical and may be or may form at least a portion of a valve seat 230 of the valve assembly 150.

As previously discussed, the flow of the fuel mixture from the fuel line 154 to the pre-chamber 122 (see FIG. 1) may be regulated by the valve assembly 150. For example, the valve assembly 150 may include a valve stem 232 slidably disposed in the passage 220 and configured to regulate or control the flow of the fuel mixture via the passage 220. The valve stem 232 may be actuated to control the flow of the fuel mixture through the passage 220 to thereby control the flow of the fuel mixture from the fuel line 154 to the fuel pipe 142.

In at least one embodiment, the valve stem 232 may include a poppet 234 at least partially extending through the passage 220 of the valve assembly 150. As illustrated in FIGS. 2A and 2B, the poppet 234 may extend substantially from the upper portion 236 of the passage 220 defined in the upper valve body 202 to and through the lower portion 238 of the passage 220 defined in the pole piece 206 and the lower valve body 204. In at least one embodiment, a first end portion 240 of the poppet 234 may be sized and/or shaped to engage or mate with the valve seat 230 to provide a fluid tight seal therewith. For example, as illustrated in FIGS. 2A and 2B, the first end portion 240 of the poppet 234 may be generally conical to optimize the engagement between the first end portion 240 of the poppet 234 and the generally conical valve seat 230 of the valve assembly 150.

In at least one embodiment, the valve stem 232 may include an armature 242 disposed about and coupled with a second end portion 244 of the poppet 234. The armature 242 may be fabricated from any one or more suitable magnetic materials. For example, the armature 242 may be fabricated from one or more soft magnetic materials and/or hard magnetic materials. Illustrative soft magnetic materials may include, but are not limited to, a nickel-iron (NiFe) alloy, such as permalloy (Fe:80Ni or Fe:78Ni), a ternary NiFeX (where X may be another element) alloy, such as supermalloy (NiFeMo), mu-metal (NiFeCuCrMo), silicon iron (Fe:4Si), nickel, or the like. The armature 242 may be coupled with the second end portion 244 of the poppet 234 via one or more adhesives such as a high temperature epoxy adhesive. As illustrated in FIGS. 2A and 2B, the armature 242 of the valve stem 232 may be disposed in the upper portion 236 of the passage 220 near or adjacent the pole piece 206. During one or more modes of operating the valve assembly 150, a magnetic air gap 246 may be defined between the armature 242 and the pole piece 206.

In at least one embodiment, the valve stem 232 may further include an annular member, such as a stop collar 248, disposed about and coupled with the poppet 234. The stop collar 248 may be fabricated from one or more non-magnetic or semi-magnetic materials including, but not limited to, stainless steel of the 300 or 400 series, and may be coupled with the poppet 234 via one or more adhesives such as a high temperature epoxy adhesive. As illustrated in FIGS. 2A and 2B, the stop collar 248 may be at least partially disposed in the lower portion 238 of the passage 220 between the pole piece 206 and the lower valve body 204. During one or more modes of operating the valve assembly 150, a stop air gap 250 may be defined between the stop collar 248 and the lower valve body 204. In at least one embodiment, the stop collar 248 may be coupled with the poppet 234 such that an axial length ($l_s$) of the stop air gap 250 may be relatively less than an axial length ($l_m$) of the magnetic air gap 246. In at least one embodiment, the fuel mixture flowing through the lower portion 238 of the passage 220 may be directed or diverted around the stop collar 248. In another embodiment, the fuel mixture flowing through the lower portion 238 of the passage 220 may be directed through the stop collar 248. For example, as illustrated in FIGS. 2A and 2B, the stop collar 248 may define one or more holes (two are shown 252) configured to provide fluid communication therethrough.

In at least one embodiment, the valve assembly 150 may include one or more bearings (two are shown 254, 256) coupled with the valve body 200 and disposed about one or more portions of the poppet 234 and configured to facilitate the actuation of the poppet 234 and/or maintain axial alignment of the poppet 234. For example, as illustrated in FIGS. 2A and 2B, a first bearing 254 may be disposed in and/or coupled with the pole piece 206, and a second bearing 256 may be disposed in and/or coupled with the lower valve body 204. Illustrative bearings 254, 256 may include, but are not limited to, sliding bearings, or the like. The bearings 254, 256 may be fabricated from one or more polymeric materials including, but not limited to, a polyamide-imide, or the like.

In at least one embodiment, one or more of the bearings 254, 256 may engage the poppet 234 to provide a fluid tight seal therebetween. For example, the first bearing 254 may be coupled with the pole piece 206 and may engage the poppet 234 to prevent fluid communication therebetween. In another embodiment, one or more of the bearings 254, 256 may define one or more axial recesses (not shown) configured to provide fluid communication therethrough. The axial recesses may be defined along an outer and/or inner surface of the bearings 254, 256 to provide fluid communication therethrough. For example, any one or more of the bearings 254, 256 may define the axial recesses along an outer surface thereof, and the fuel mixture may flow around the bearings 254, 256 via the axial recesses.

In at least one embodiment, the poppet 234 may define a channel 258 and one or more fluid ports (two are shown 260) configured to fluidly couple the upper portion 236 and the lower portion 238 of the passage 220 with one another. As illustrated in FIGS. 2A and 2B, the channel 258 may extend from the second end portion 244 of the poppet 234 toward the first end portion 240 of the poppet 234, and the fluid ports 260 may extend from the channel 258 to the lower portion 238 of the passage 220 to provide fluid communication therebetween. Accordingly, the upper portion 236 of the passage 220 may be fluidly coupled with the lower portion 238 of the passage 220 via the channel 258 and the fluid ports 260 defined in the poppet 234.

In at least one embodiment, the valve assembly 150 may include a solenoid 262 configured to actuate the valve stem 232 and thereby control the flow of the fuel mixture from the fuel line 154 to the fuel pipe 142. As illustrated in FIGS. 2A and 2B, the solenoid 262 may be disposed in and/or coupled with the upper valve body 202 of the valve assembly 150. For example, the upper valve body 202 may define an annular recess 264 extending radially outward from the upper portion 236 of the passage 220, and the solenoid 262 may be at least partially disposed in the annular recess 264. In at least one embodiment, the solenoid 262 may include an annular bobbin 266 extending about the annular recess 264 and configured to support or house a coil 268 configured to power the solenoid 262. The annular bobbin 266 may be fabricated from one or more polymeric materials including, but not limited to, a polyamide-imide, or the like. The coil 268 may be or include a magnet wire having one or more insulating layers. The insulating layers may include one or more polymeric materials including, but not limited to a polyimide, or the like. The coil 268 of the solenoid 262 may be electrically coupled with a power source (not shown) via one or more cables (one is shown 270). For example, the first end portion 224 of the upper valve body 202 may define a cable port 272 configured to receive the cable 270, and the cable 270 may at least partially extend through the cable port 272 to electrically couple the power source with the coil 268 to power the solenoid 262.

In at least one embodiment, the pole piece 206 may be fabricated from any one or more suitable magnetic materials. For example, the pole piece 206 may be fabricated from any one or more of the soft magnetic materials previously discussed. In at least one embodiment, at least a portion of the pole piece 206 may be disposed near or adjacent the solenoid 262, and configured to at least partially define a flux path of the solenoid 262 and/or the coil 268 thereof. For example, as illustrated in FIGS. 2A and 2B, a first end portion 282 of the pole piece 206 may be disposed radially inward of the solenoid 262 to at least partially define the flux path of the solenoid 262 and/or the coil 268 thereof.

In at least one embodiment, the valve assembly 150 may include a cable relief system 274 configured to provide strain relief for the cable 270 extending through the cable port 272. The cable relief system 274 may include one or more elastomeric members (seven are shown 276) disposed about at least a portion of the cable 270 and a compression member 278 disposed adjacent the elastomeric members 276 and configured to apply compressive forces to the elastomeric members 276. For example, the elastomeric members 276 may be disposed in the cable port 272 between the compression member 278 and a shoulder 280 of the cable port 272. The compression member 278 may be urged or actuated toward the shoulder 280 to apply the compressive forces to the elastomeric members 276 and thereby compress the elastomeric members 276. In at least one embodiment, the compression member 278 may be disposed in the cable port 272 and coupled with the upper valve body 202 via an interference fit. In another embodiment, the compression member 278 may be disposed in the cable port 272 and coupled with the upper valve body 202 via threads (not shown).

In at least one embodiment, a tubular member 284, such as an isolation tube 284, may be disposed in the upper portion 236 of the passage 220. The isolation tube 284 may be fabricated from one or more non-magnetic or semi-magnetic materials including, but not limited to, stainless steel of the 300 or 400 series. The isolation tube 284 may be configured to provide a non-magnetic or semi-magnetic layer between the solenoid 262 and one or more components of the valve assembly 150. For example, as illustrate in FIGS. 2A and 2B, the isolation tube 284 may be disposed between the solenoid 262 and the first end portion 282 of the pole piece 206. In another example, illustrated in FIGS. 2A and 2B, the isolation tube 284 may be disposed between the solenoid 262 and the armature 242 of the valve stem 232. The isolation tube 284 may also be configured to provide a low friction bearing surface to facilitate the actuation of the valve stem 232. For example, as illustrated in FIGS. 2A and 2B, at least a portion of the armature 242 may be slidably disposed in the isolation tube 284, and the low friction bearing surface of the isolation tube 284 may facilitate the sliding or actuation of the valve stem 232 within the isolation tube 284.

FIG. 2A illustrates the valve assembly 150 in a closed position where the first end portion 240 of the poppet 234 may engage or mate with the valve seat 230 and thereby prevent fluid communication through the outlet 228 of the valve assembly 150. The valve assembly 150 may be held or urged in the closed position by one or more biasing members (one is shown 286). In at least one embodiment, the biasing members 286 may be disposed adjacent the stop collar 248 and may engage the stop collar 248 to apply or exert a biasing force to the stop collar 248 and the poppet 234 coupled therewith in a direction toward the upper valve body 202, as indicated by arrow 288. The biasing force 288 may be applied to the stop collar 248 and the poppet 234 coupled therewith to engage the first end portion 240 of the poppet 234 with the valve seat 230 and thereby prevent fluid communication through the outlet 228 of the valve assembly 150. In at least one embodiment, the biasing member 286 may be disposed between the stop collar 248 and an inner end surface 290 of the lower valve body 204. In another embodiment, illustrated in FIGS. 2A and 2B, the biasing member 286 may be disposed between the stop collar 248 and the second bearing 256 coupled with the lower valve body 204.

The biasing member 286 may be or include any force producing system or device. For example, the biasing member 286 may be or include one or more electro-mechanical actuators, elastomeric members, or the like, or any combination thereof. In another example, as illustrated in FIGS. 2A and 2B, the biasing member 286 may be or include a spring 286. In at least one embodiment, a spring constant of the spring 286 may be varied such that the biasing force 288 applied to the stop collar 248 may be optimized. For example, the spring constant of the springs 286 may be varied to increase or decrease the biasing force 288 applied to the stop collar. In another embodiment, the number of the biasing members or springs 286 may be increased to correspondingly increase the biasing force 288 applied to the stop collar 248.

In operation, the valve assembly 150 may be actuated between the closed position, as shown in FIG. 2A, and an opened position, as illustrated in FIG. 2B. In the closed position, as illustrated in FIG. 2A, the first end portion 240 of the poppet 234 may engage or mate with the valve seat 230 and thereby prevent fluid communication between the passage 220 and the fuel pipe 142 via the outlet 228 of the valve assembly 150. As previously discussed, the valve assembly 150 may be held in the closed position by the biasing member 286. To actuate the valve assembly 150 to the opened position (see FIG. 2B), the coil 268 of the solenoid 262 may be powered or energized by directing electrical power from the power source (not shown) to the coil 268 via the cable 270. Energizing the coil 268 may create an electromagnetic flux near or proximal the solenoid 262. The electromagnetic flux may result in a magnetic attraction or force between the armature 242 of the valve stem 232 and the pole piece 206. The magnetic force between the armature 242 and the pole piece 206 may be greater than the biasing force 288 applied by the biasing member 286, thereby actuating the armature 242 of the valve stem 232 toward the pole piece 206 and reducing the axial length ($l_m$) of the magnetic air gap 246 and the axial length ($l_s$) of the stop air gap 250.

As previously discussed, the stop collar 248 may be coupled with the poppet 234 such that the axial length ($l_s$) of the stop air gap 250 may be relatively less than the axial length ($l_m$) of the magnetic air gap 246. As such, the armature 242 of the valve stem 232 may be actuated toward the pole piece 206 until the stop collar 248 engages the lower valve body 204. Accordingly, the stop air gap 250 may prevent the armature 242 from contacting the pole piece 206, and may at least partially determine an axial length in which the valve stem 232 may be actuated.

As illustrated in FIG. 2B, actuating the armature 242 may correspondingly actuate the poppet 234 coupled therewith and disengage the first end portion 240 of the poppet 234 from the valve seat 230, thereby providing fluid communication between the fuel line 154 and the fuel pipe 142 via the passage 220 and the outlet 228 of the valve assembly 150. Accordingly, energizing the coil 268 of the solenoid 262 may actuate the valve assembly 150 from the closed position (see FIG. 2A) to the opened position (see FIG. 2B) to thereby inject the fuel mixture from the fuel line 154 to the pre-chamber 122 (see FIG. 1). The valve assembly 150 may be actuated from the opened position to the closed position by de-energizing the coil 268, thereby decreasing or eliminating the magnetic force between the armature 242 and the pole piece 206. Without the magnetic force, the biasing force 288 applied by the biasing member 286 may urge the valve assembly 150 back into the closed position.

In at least one embodiment, the electrical power may be directed from the power source to the coil 268 at the same or varying frequencies. The frequency of the electrical power may determine, at least in part, the flow and/or amount of the fuel mixture directed to the pre-chamber 122. For example, increasing the frequency of the electrical power directed to the coil 268 may increase the time in which the valve assembly 150 may be actuated in the opened position and correspondingly increase the amount of the fuel mixture directed to the pre-chamber 122. Similarly, decreasing the frequency of the electrical power directed to the coil 268 may decrease the time in which the valve assembly 150 may be actuated in the opened position and correspondingly decrease the amount of the fuel mixture directed to the pre-chamber 122. In at least one embodiment, the flow of the fuel mixture directed to the pre-chamber 122 may also be determined, at least in part, by a pressure of the fuel mixture contained in the fuel supply.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A solenoid valve for a pre-chamber, comprising:
   a valve body defining an inlet port fluidly coupled with a fuel line at a first end portion thereof, an outlet port fluidly coupled with the pre-chamber at a second end portion thereof, and a passage fluidly coupling the inlet port with the outlet port;
   a valve stem slidably disposed in the passage between a first position and a second position, a first end portion of the valve stem configured to engage the outlet port in the first position to thereby prevent fluid communication therethrough;

a biasing member disposed in the passage and configured to apply a biasing force to the valve stem to thereby actuate the valve stem to the first position and engage the first end portion of the valve stem with the outlet port;

a solenoid coupled with the valve body and configured to actuate the valve stem to the second position to thereby disengage the first end portion of the valve stem from the outlet port and allow fluid communication therethrough; and a stop collar coupled with the valve stem and disposed proximal a lower portion of the valve body, the stop collar and the lower portion of the valve body defining a stop gap therebetween, wherein the biasing member is disposed between the stop collar and an inner end surface of the lower portion of the valve body, the biasing member configured to apply the biasing force to the valve stem via the stop collar coupled therewith.

2. The solenoid valve of claim 1, wherein the valve stem comprises a magnetic armature coupled with a second end portion thereof and disposed proximal a pole piece of the valve body, the magnetic armature and the pole piece defining a magnetic air gap therebetween.

3. The solenoid valve of claim 2, wherein the solenoid is configured to generate a magnetic attractive force between the magnetic armature and the pole piece, the magnetic attractive force being greater than the biasing force to actuate the valve stem from the first position to the second position.

4. The solenoid valve of claim 1, wherein the solenoid comprises:
an annular bobbin coupled to the valve body; and
a coil extending about the annular bobbin and configured to power the solenoid.

5. The solenoid valve of claim 1, wherein the valve body further defines a cable port at the first end portion thereof, the cable port configured to receive a cable configured to direct electrical power from a power source to the solenoid.

6. The solenoid valve of claim 5, further comprising a cable relief system configured to provide strain relief for the cable, the cable relief system comprising:
an elastomeric member interposed between the cable and the cable port; and
a compression member disposed adjacent the elastomeric member and configured to apply a compressive force to the elastomeric member to thereby compress the elastomeric member.

7. The solenoid valve of claim 1, further comprising a bearing extending about the valve stem and coupled with the valve body, the bearing configured to facilitate the actuation and maintain alignment of the valve stem.

8. The solenoid valve of claim 1, further comprising a filter disposed in the inlet port and configured to separate solid particulates from a fuel mixture flowing therethrough.

9. An internal combustion engine comprising:
a solenoid valve comprising:
a valve body defining an inlet port fluidly coupled with a fuel line at a first end portion thereof, an outlet port fluidly coupled with the pre-chamber at a second end portion thereof, and a passage fluidly coupling the inlet port with the outlet port;
a valve stem slidably disposed in the passage between a first position and a second position, a first end portion of the valve stem configured to engage the outlet port in the first position to thereby prevent fluid communication therethrough;

a biasing member disposed in the passage and configured to apply a biasing force to the valve stem to thereby actuate the valve stem to the first position and engage the first end portion of the valve stem with the outlet port;

a solenoid coupled with the valve body and configured to actuate the valve stem to the second position to thereby disengage the first end portion of the valve stem from the outlet port and allow fluid communication therethrough; and a stop collar coupled with the valve stem and disposed proximal a lower portion of the valve body, the stop collar and the lower portion of the valve body defining a stop gap therebetween, wherein the biasing member is disposed between the stop collar and an inner end surface of the lower portion of the valve body, the biasing member configured to apply the biasing force to the valve stem via the stop collar coupled therewith;

a cylinder head defining a main combustion chamber and a port extending therethrough to the main combustion chamber;

a pre-chamber assembly at least partially disposed in the port and coupled with the cylinder head, the pre-chamber assembly defining the pre-chamber and a fuel port fluidly coupling the pre-chamber with the main combustion chamber; and a fuel pipe fluidly coupling the outlet port of the solenoid valve and the pre-chamber.

10. A solenoid valve for a pre-chamber, comprising:
a valve body defining an inlet port at a first end portion thereof, an outlet port fluidly coupled with the pre-chamber at a second end portion thereof, and a passage fluidly coupling the inlet port with the outlet port, the valve body comprising
an upper annular portion defining an upper portion of the passage;
an annular pole piece coupled with the upper annular portion; and
a lower annular portion coupled with the annular pole piece, the annular pole piece and the lower annular portion at least partially defining a lower portion of the passage;
a valve stem slidably disposed in the passage between a first position and a second position, a first end portion of the valve stem configured to engage the outlet port in the first position to thereby prevent fluid communication therethrough;
a biasing member disposed in the lower portion of the passage and configured to apply a biasing force to the valve stem to thereby actuate the valve stem to the first position and engage the first end portion of the valve stem with the outlet port; and
a solenoid coupled with the upper annular portion and configured to actuate the valve stem to the second position and disengage the first end portion of the valve stem from the outlet port to thereby allow fluid communication therethrough; and
a stop collar coupled with the valve stem and disposed proximal the lower annular portion, the stop collar and the lower annular portion defining a stop gap therebetween,
wherein the biasing member is disposed between the stop collar and an inner end surface of the lower annular portion, the biasing member configured to apply the biasing force to the valve stem via the stop collar coupled therewith.

11. The solenoid valve of claim 10, wherein the valve stem further comprises a magnetic armature coupled with a second end portion of the valve stem and disposed proximal the annular pole piece, the magnetic armature and the annular pole piece defining a magnetic air gap therebetween.

12. The solenoid valve of claim 11, wherein the solenoid is configured to generate a magnetic attractive force between the magnetic armature and the annular pole piece, the magnetic attractive force being greater than the biasing force to actuate the valve stem from the first position to the second position.

13. The solenoid valve of claim 10, wherein the solenoid comprises:

an annular bobbin extending about and coupled with an annular recess formed in the upper annular portion; and a coil extending about the annular bobbin and configured to deliver power to the solenoid.

14. The solenoid valve of claim 10, wherein the upper annular portion defines a cable port configured to receive a cable, the cable being configured to direct electrical power from a power source to the solenoid.

15. The solenoid valve of claim 14, further comprising a cable relief system configured to provide strain relief for the cable, the cable relief system comprising:

an elastomeric member interposed between the cable and the cable port; and a compression member disposed adjacent the elastomeric member and configured to apply a compressive force to the elastomeric member to thereby compress the elastomeric member.

16. The solenoid valve of claim 10, further comprising a filter disposed in the inlet port and configured to separate solid particulates from a fuel mixture flowing therethrough.

\* \* \* \* \*